US011884331B2

(12) United States Patent
Sakai

(10) Patent No.: US 11,884,331 B2
(45) Date of Patent: Jan. 30, 2024

(54) CENTER PILLAR MANUFACTURING METHOD

(71) Applicant: HONDA MOTOR CO., LTD., Tokyo (JP)

(72) Inventor: Hiroyuki Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 869 days.

(21) Appl. No.: 16/864,784

(22) Filed: May 1, 2020

(65) Prior Publication Data

US 2020/0353991 A1    Nov. 12, 2020

(30) Foreign Application Priority Data

May 8, 2019   (JP) .................................. 2019-088587

(51) Int. Cl.
| | |
|---|---|
| *B62D 25/04* | (2006.01) |
| *B62D 65/02* | (2006.01) |
| *C21D 1/18* | (2006.01) |
| *C21D 9/46* | (2006.01) |

(52) U.S. Cl.
CPC ............ *B62D 25/04* (2013.01); *B62D 65/02* (2013.01); *C21D 1/18* (2013.01); *C21D 9/46* (2013.01)

(58) Field of Classification Search
CPC ............ B62D 25/04; C21D 1/18; C21D 9/46
See application file for complete search history.

(56) References Cited

U.S. PATENT DOCUMENTS

| | | | |
|---|---|---|---|
| 2011/0127802 A1 | 6/2011 | Kim et al. | |
| 2014/0147693 A1* | 5/2014 | Yasuyama | B32B 3/00 |
| | | | 428/603 |
| 2015/0008703 A1 | 1/2015 | Furusaki et al. | |
| 2016/0082495 A1 | 3/2016 | Miyagi et al. | |
| 2016/0221609 A1 | 8/2016 | Furusaki et al. | |

(Continued)

FOREIGN PATENT DOCUMENTS

| | | |
|---|---|---|
| CN | 104114438 A | 10/2014 |
| CN | 105188982 A | 12/2015 |

(Continued)

OTHER PUBLICATIONS

Office Action received in corresponding CN application No. 202010373871.3 dated Feb. 15, 2022 with English translation (14 pages).

(Continued)

*Primary Examiner* — Anthony M Liang
*Assistant Examiner* — Danny N Kang
(74) *Attorney, Agent, or Firm* — Rankin, Hill & Clark LLP

(57) ABSTRACT

A center pillar manufacturing method includes: a first step of stacking a projected crest portion and a pair of projected joining wall portions of a primary steel plate on a secondary steel plate, and temporarily joining the primary steel plate to the secondary steel plate; a second step of forming a stiffener by subjecting the primary steel plate and the secondary steel plate to hot press; a third step of joining the stiffener to a center pillar outer member having an outer wall portion of the center pillar; and a fourth step of joining a pillar inner member having an inner wall portion of the center pillar to the pillar outer member after joining the stiffener.

7 Claims, 11 Drawing Sheets

(56) References Cited

U.S. PATENT DOCUMENTS

2016/0272248 A1   9/2016   Furusaki et al.
2017/0088184 A1   3/2017   Emura

FOREIGN PATENT DOCUMENTS

| JP | 2004-314845 A | | 11/2004 |
|---|---|---|---|
| JP | 2004314845 A | * | 11/2004 |
| JP | 2005-153800 A | | 6/2005 |
| JP | 2005-313685 A | | 11/2005 |
| JP | 2007-326376 A | | 12/2007 |
| JP | 2014-200840 A | | 10/2014 |
| WO | 2012/036262 A1 | | 3/2012 |
| WO | 2015/146903 A1 | | 10/2015 |

OTHER PUBLICATIONS

Office Action received in corresponding Japanese application No. 2019-088587 dated Mar. 2, 2021 with English translation (7 pages).

* cited by examiner

CENTER PILLAR MANUFACTURING METHOD

BACKGROUND OF THE INVENTION

1. Field of the Invention

The present invention relates to a CENTER PILLAR MANUFACTURING METHOD of a vehicle.

2. Description of the Related Art

A center pillar of a vehicle is designed to reduce its cross-section above a beltline in order to ensure visibility. Japanese Patent Application Publication No. 2004-314845 discloses a structure in which a portion of a center pillar above a beltline is reinforced by using a stiffener. The stiffener substantially takes on a W-shape in plan view at its portion above the beltline, thereby bringing crest portions and a trough portion thereof to be opposed to an inner wall portion and an outer wall portion of the center pillar. In the meantime, an outer end portion in a vehicle width direction of the stiffener is subjected to quenching so as to increase its hardness on a compression side in a bending action, thus suppressing bending deformation. In this structure, however, leg portions that join the crest portions to the trough portion are not subjected to the quenching and are therefore prone to deformation without resisting a side impact load. Note that the quenching is a thermal treatment in which an iron or steel material (steel in particular) is heated until its metallographic structure is transformed into an austenite structure, and then the material is subjected to press work and rapid cooling so as to obtain a martensite structure. The quenching is also referred to as hot press.

Meanwhile, Japanese Patent Application Publication No. 2014-200840 discloses a vehicle body frame that takes on a rectangular cross-section, which has a structure to reinforce an entire inner surface of a primary steel plate that takes on a U-shaped cross-section with a secondary steel plate.

The structure disclosed in Japanese Patent Application Publication No. 2004-314845 can improve bending strength by forming the stiffener substantially into the W-shape. Nonetheless, there has been a demand for further improvement in strength and rigidity.

In order to increase a reinforcement effect of the structure disclosed in Japanese Patent Application Publication No. 2014-200840, it is necessary to increase width dimensions of three surfaces of the primary steel plate (and to increase a width dimension of the secondary steel plate accordingly) or to increase a plate thickness of the secondary steel plate. However, the increase in width dimensions of the primary steel plate leads to an increase in front-rear width of a center pillar of a vehicle, which is not desirable in light of potential deterioration of visibility. On the other hand, the increase in plate thickness of the secondary steel plate causes an increase in weight and leads to reduction in fuel efficiency.

SUMMARY OF THE INVENTION

The present invention has been made in view of the aforementioned circumstances, and an object thereof is to provide a center pillar manufacturing method which is capable of obtaining a structure that is light in weight and strong against aside impact load.

To solve the aforementioned problems, a center pillar manufacturing method according to an aspect of the present invention is a center pillar manufacturing method of a vehicle provided with a stiffener having a substantially W-shaped cross-section formed from a crest portion and a pair of trough portions provided on two sides of the crest portion. The method includes: a first step of stacking a primary steel plate and a secondary steel plate extending across the crest portion of the primary steel plate and having a shorter length than a length between bottom surfaces of the trough portions, and temporarily joining the primary steel plate to the secondary steel plate; a second step of forming the stiffener by press-molding and quenching the primary steel plate substantially into a W-shape and press-molding and quenching the secondary steel plate substantially into a U-shape; a third step of joining a flange portion of a pillar outer member having an outer wall portion in a vehicle width direction of the center pillar to a flange portion of the stiffener; and a fourth step of joining a pillar inner member having an inner wall portion in the vehicle width direction of the center pillar to the pillar outer member after joining the stiffener in such a way as to sandwich the flange portion of the stiffener with a flange portion of the pillar inner member and the flange portion of the pillar outer member.

The center pillar manufacturing method can prevent displacement between the primary steel plate and the secondary steel plate during a pressing process or the like when a blank material (a temporarily joined unit of the primary steel plate and the secondary steel plate) is conveyed or set on molds. Moreover, according to the center pillar manufacturing method, the secondary steel plate serves as the U-shaped reinforcing member that reinforces the crest portion and a pair of leg portions of the primary steel plate. Thus, it is possible to form the leg portions by using a thick plate portion where the primary steel plate overlaps the secondary steel plate, thereby improving a resisting effect of the leg portions against a side impact load and suppressing collapse deformation of the leg portions. Furthermore, according to the center pillar manufacturing method, the primary steel plate is substantially press-molded into the W-shape while the secondary steel plate is substantially press-molded into the U-shape. Thus, the secondary steel plate does not extend to the trough portions where a contribution rate to a side impact load is low so that the secondary steel plate can be reduced in size and weight. In addition, since each trough portion is formed from the first steel plate alone, it is possible to realize the complex W-shape by hot press-molding.

DETAILED DESCRIPTION OF THE EMBODIMENTS

An embodiment of the present invention will be hereinafter described in detail with reference to the accompanying drawings as appropriate while focusing on an example in which a vehicle body side structure of the present invention is applied to a structure around a center pillar on a left side of a vehicle (such as an automobile). The same constituents will be denoted by the same reference signs and overlapping explanations thereof will be omitted. Terms indicating directions such as an up-down direction, a front-rear direction, and a right-left direction (a vehicle width direction) are based on the viewpoint of an occupant (a driver) of a vehicle.

<Vehicle Body Side Structure>

Figure 1:
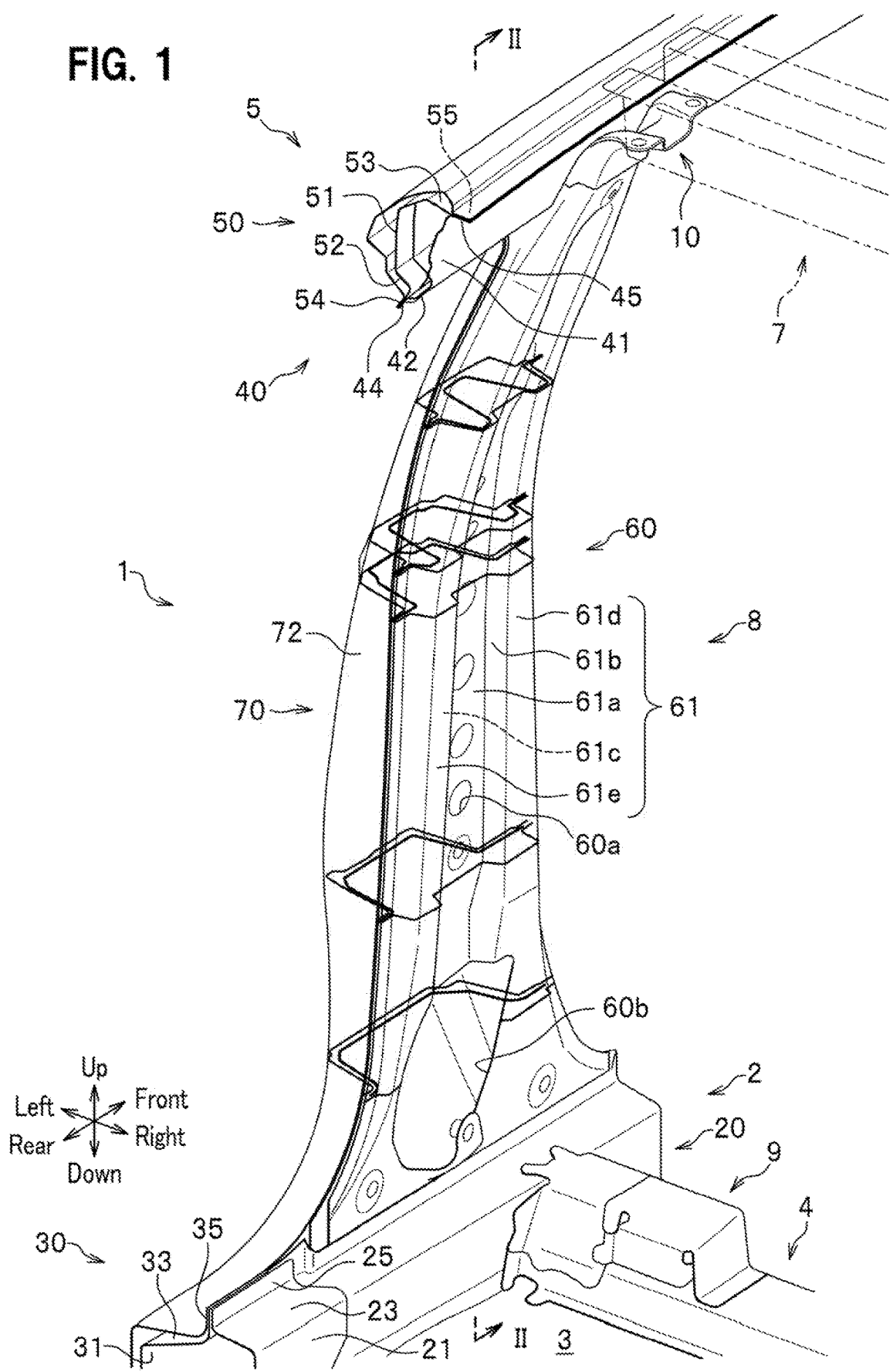
FIG. 1 is a diagram schematically showing a vehicle body side structure according to an embodiment of the present invention, which is a perspective view from inside of a vehicle on a rear side.
Figure 2:
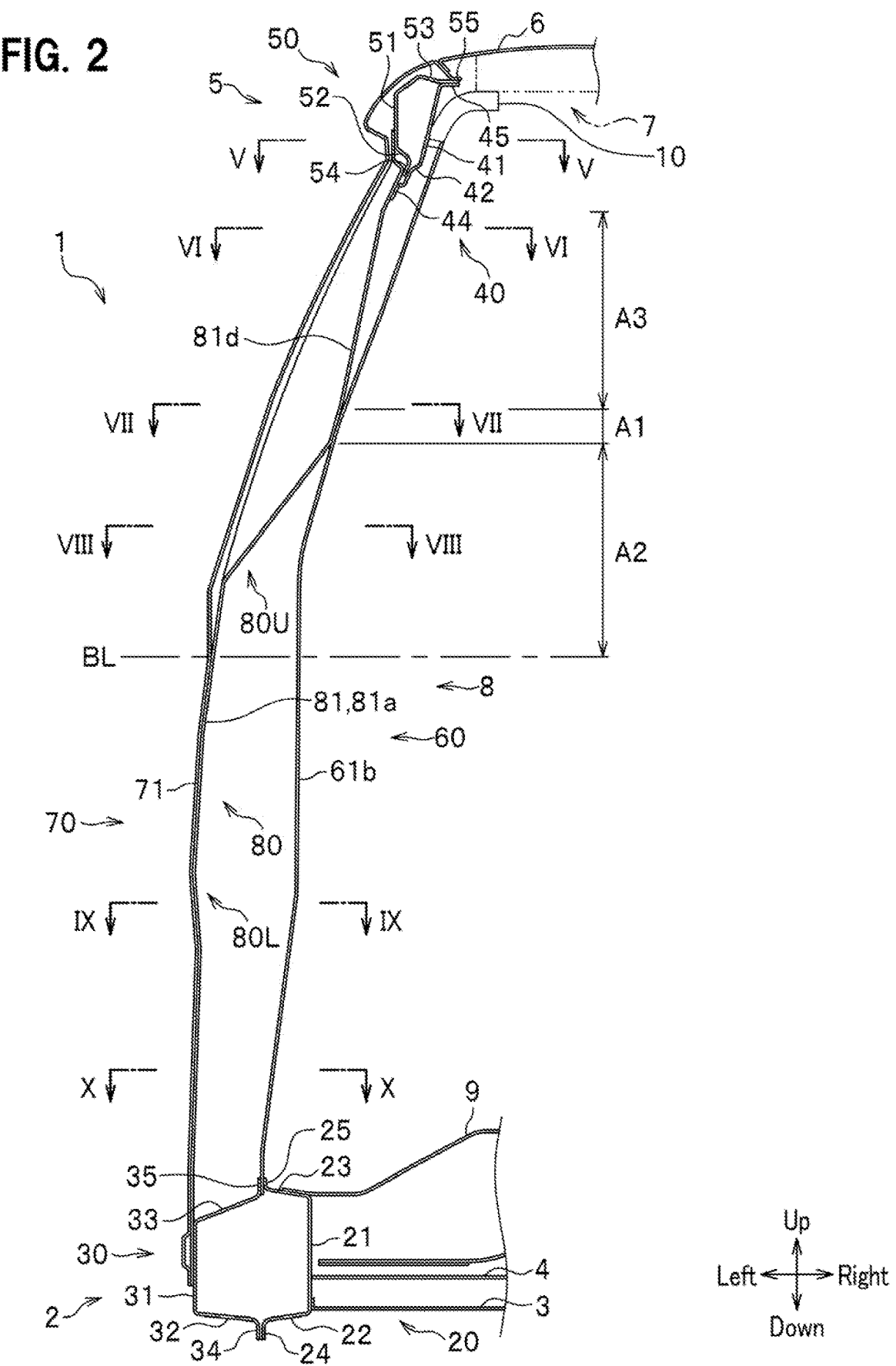
FIG. 2 is a cross-sectional view taken along the II-II line corresponding to a trough portion in FIG. 1.

As shown in FIGS. 1 and 2, a vehicle body side structure 1 according to an embodiment of the present invention includes a side sill 2, a floor panel 3, a cross member 4, a roof side rail 5, a roof panel 6, a roof arch 7, a center pillar 8, a seat attachment bracket 9, and a roof arch connection bracket 10.

<Side Sill>

The side sill 2 is a metallic framework member extending in the front-rear direction at a lower part of a vehicle which is also an end portion in a vehicle width direction. The side sill 2 takes on a substantially rectangular closed cross-section in front view. The side sill 2 is formed by combining a side sill inner member 20 that constitutes an interior portion in the vehicle width direction of the side sill 2 and a side sill outer member 30 that constitutes an exterior portion in the vehicle width direction of the side sill 2.

<<Side Sill Inner Member>>

The side sill inner member 20 is integrally provided with an inner wall portion (a vehicle-widthwise inner wall portion) 21 that extends in the front-rear direction and in the up-down direction, a lower wall portion 22 that extends outward in the vehicle width direction from a lower end portion of the inner wall portion 21, and an upper wall portion 23 that extends outward in the vehicle width direction from an upper end portion of the inner wall portion 21. Moreover, the side sill inner member 20 is integrally provided with a flange portion 24 that extends downward from an outer end portion in the vehicle width direction of the lower wall portion 22, and a flange portion 25 that extends upward from an outer end portion in the vehicle width direction of the upper wall portion 23.

<<Side Sill Outer Member>>

The side sill outer member 30 is integrally provided with an outer wall portion (a vehicle-widthwise outer wall portion) 31 that extends in the front-rear direction and in the up-down direction, a lower wall portion 32 that extends inward in the vehicle width direction from a lower end portion of the outer wall portion 31, and an upper wall portion 33 that extends inward in the vehicle width direction from an upper end portion of the outer wall portion 31. Moreover, the side sill outer member 30 is integrally provided with a flange portion 34 that extends downward from an inner end portion in the vehicle width direction of the lower wall portion 32, and a flange portion 35 that extends upward from an inner end portion in the vehicle width direction of the upper wall portion 33.

The flange portion 24 and the flange portion 34 are joined to each other by welding or the like. The flange portion 25 and the flange portion 35 are joined to each other by welding or the like. Here, the side sill 2 may be configured to include a stiffener as a reinforcing member to be inserted between the side sill inner member 20 and the side sill outer member 30 as with the center pillar 8 to be described later.

<Floor Panel>

The floor panel 3 is a member which is installed between the pair of right and left side sills 2 and constitutes a floor of the vehicle. Each end portion in the vehicle width direction of the floor panel 3 is joined by welding or the like to an inner surface in the vehicle width direction of the inner wall portion 21 of the side sill inner member 20.

<Cross Member>

The cross member 4 is a metallic framework member which is installed between the pair of right and left side sills 2. The cross member 4 alone takes on a substantially U-shaped cross-sectional shape having an opening on a lower side in side view, and takes on a substantially rectangular closed cross-section in side view in cooperation with the floor panel 3.

The cross member 4 is integrally provided with an upper wall portion that extends in the front-rear direction and in the vehicle width direction, a front wall portion that extends downward from a front end portion of the upper wall portion, and a rear wall portion that extends downward from a rear end portion of the upper wall portion. Moreover, the cross member 4 is integrally provided with a flange portion that extends forward from a lower end portion of the front wall portion, and a flange portion that extends rearward from a lower end portion of the rear wall portion.

The pair of front and rear flange portions of the cross member 4 are joined by welding or the like to an upper surface of the floor panel 3. Each end portion in the vehicle width direction of the cross member 4 is joined by welding or the like to the inner surface in the vehicle width direction of the inner wall portion 21 of the side sill inner member 20.

<Roof Side Rail>

The roof side rail 5 is a metallic framework member extending laterally and above the vehicle in the front-rear direction thereof. The roof side rail 5 takes on a substantially rectangular closed cross-section in front view. The roof side rail 5 is formed by combining a roof side rail inner member 40 that constitutes an interior portion in the vehicle width direction of the roof side rail 5 and a roof side rail outer member 50 that constitutes an exterior portion in the vehicle width direction of the roof side rail 5.

<<Roof Side Rail Inner Member>>

The roof side rail inner member 40 is integrally provided with an inner wall portion (a vehicle-widthwise inner wall portion) 41 that extends in the front-rear direction and in the up-down direction, and a lower wall portion 42 that extends outward in the vehicle width direction from a lower end portion of the inner wall portion 41. Moreover, the roof side rail inner member 40 is integrally provided with a flange portion 44 that extends downward from an outer end portion in the vehicle width direction of the lower wall portion 42, and a flange portion 45 that extends inward in the vehicle width direction from an upper end portion of the inner wall portion 41. Part of the flange portion 45 is formed to extend downward beyond a flange portion 55 of the roof side rail outer member 50 to be described below.

<<Roof Side Rail Outer Member>>

The roof side rail outer member 50 is integrally provided with an outer wall portion (a vehicle-widthwise outer wall portion) 51 that extends in the front-rear direction and in the up-down direction, a lower wall portion 52 that extends inward in the vehicle width direction from a lower end portion of the outer wall portion 51, and an upper wall portion 53 that extends inward in the vehicle width direction from an upper end portion of the outer wall portion 51. Moreover, the roof side rail outer member 50 is integrally provided with a flange portion 54 that extends downward from an inner end portion in the vehicle width direction of the lower wall portion 52, and the flange portion 55 that extends inward in the vehicle width direction from an inner end portion in the vehicle width direction of the upper wall portion 53.

The flange portion 44 and the flange portion 54 are joined to each other by welding or the like. The flange portion 45 and the flange portion 55 are joined to each other by welding or the like. Here, the roof side rail 5 may be configured to include a stiffener as a reinforcing member to be inserted between the roof side rail inner member 40 and the roof side rail outer member 50 as with the center pillar 8 to be described later.

<Roof Panel>

The roof panel 6 is a metallic plate-like member which is installed between the pair of right and left roof side rails 5 and constitutes a roof of the vehicle. The roof panel 6 forms an outer surface (a skin) of the vehicle.

<Roof Arch>

The roof arch 7 is a metallic framework member which is installed between the pair of right and left roof side rails 5. The roof arch 7 alone takes on a substantially U-shaped cross-sectional shape having an opening on an upper side in side view, and takes on a substantially rectangular closed cross-section in side view in cooperation with the roof panel 6. The roof arch 7 is integrally provided with a lower wall portion that extends in the front-rear direction and in the vehicle width direction, a front wall portion that extends upward from a front end portion of the lower wall portion, and a rear wall portion that extends upward from a rear end portion of the lower wall portion. Moreover, the roof arch 7 is integrally provided with a flange portion that extends forward from an upper end portion of the front wall portion, and a flange portion that extends rearward from an upper end portion of the rear wall portion.

The pair of front and rear flange portions of the roof arch 7 are joined to an upper surface of the roof panel 6 by using mastic sealers and the like.

<Center Pillar>

The center pillar 8 is a metallic framework extending in the up-down direction and installed between the side sill 2 and the roof side rail 5. The center pillar 8 (which is an assembly of a center pillar inner member 60 and a center pillar outer member 70 to be described below) takes on a substantially rectangular closed cross-section in plan view.

A width in the front-rear direction of the center pillar 8 is set relatively small at a portion above a beltline BL (hereinafter referred to as a super-beltline portion) in order to ensure visibility and is set relatively large at a portion below the beltline BL (hereinafter referred to as a sub-beltline portion) in order to allow attachment of a door. The center pillar 8 is formed by combining the center pillar inner member 60 that constitutes an interior portion in the vehicle width direction of the center pillar 8, the center pillar outer member 70 that constitutes an exterior portion in the vehicle width direction of the center pillar 8, and a stiffener 80 disposed inside for the purpose of reinforcement.

<<Center Pillar Inner Member>>

The center pillar inner member 60 is integrally provided with an inner wall portion (a vehicle-widthwise inner wall portion) 61 that extends in the front-rear direction and in the up-down direction, a front wall portion 62 that extends outward in the vehicle width direction from a front end portion of the inner wall portion 61, and a rear wall portion 63 that extends outward in the vehicle width direction from a rear end portion of the inner wall portion 61. Moreover, the center pillar inner member 60 is integrally provided with a flange portion 64 that extends forward from an outer end portion in the vehicle width direction of the front wall portion 62, and a flange portion 65 that extends rearward from an outer end portion in the vehicle width direction of the rear wall portion 63.

The inner wall portion 61 is integrally provided with a joining portion 61*a* located at an intermediate portion in the front-rear direction, a side wall 61*b* which forms a trough portion (a groove portion) that is recessed inward in the vehicle width direction from a front end portion of the joining portion 61*a*, and a side wall 61*c* which forms a trough portion (a groove portion) that is recessed inward in the vehicle width direction from a rear end portion of the joining portion 61*a*. Moreover, the inner wall portion 61 is integrally provided with a trough wall portion 61*d* that extends forward from an inner end portion in the vehicle width direction of the side wall 61*b*, and a trough wall portion 61*e* that extends rearward from an inner end portion in the vehicle width direction of the side wall 61*c*. In other words, the pair of front and rear trough wall portions 61*d* and 61*e* are recessed inward in the vehicle width direction relative to the joining portion 61*a*. A front end portion of the trough wall portion 61*d* is joined to the front wall portion 62 and a rear end portion of the trough wall portion 61*e* is joined to the rear wall portion 63.

The inner wall portion 61 is provided with multiple hole portions 60*a* arranged in the up-down direction. The hole portions 60*a* are provided for the purpose of reducing the weight of the center pillar inner member 60. A hole portion 60*b* which is larger than each hole portion 60*a* is formed at a lower end portion of the inner wall portion 61. The hole portion 60*b* is provided in order to house a retractor for a seat belt in an internal space of the roof panel 6.

At the upper end portion of inner wall portion 61, a groove portion formed by the joining portion 61*a* and the pair of front and rear side walls 61*b* and 61*c* in such a way as to bulge outward between the pair of front and rear trough wall portions 61*d* and 61*e* is gradually flattened toward the upper part of the vehicle as the groove portion gradually comes close to the trough wall portions 61*d* and 61*e* while the side walls 61*b* and 61*c* gradually diminish. Thus, the joining portion 61*a* is joined to the pair of front and rear trough wall portions 61*d* and 61*e*.

The inner wall portion 61 of the center pillar inner member 60 takes on a bent (curved) shape that projects outward in the vehicle width direction in front view. To be more precise, the inner wall portion 61 of the center pillar inner member 60 bulges outward in the vehicle width direction from the upper end portion of the inner wall portion 61 toward the beltline BL to be described later, and extends in a vertical direction at a portion below the beltline BL. This design is made in order to ensure a large vehicle interior space.

<<Center Pillar Outer Member>>

The center pillar outer member 70 is integrally provided with an outer wall portion (a vehicle-widthwise outer wall portion) 71 that extends in the front-rear direction and in the up-down direction, a front wall portion 72 that extends inward in the vehicle width direction from a front end portion of the outer wall portion 71, and a rear wall portion 73 that extends inward in the vehicle width direction from a rear end portion of the outer wall portion 71.

Moreover, the center pillar outer member 70 is integrally provided with a flange portion 74 that extends forward from an inner end portion in the vehicle width direction of the front wall portion 72, and a flange portion 75 that extends rearward from an inner end portion in the vehicle width direction of the rear wall portion 73.

<<Stiffener>>

Figure 3:
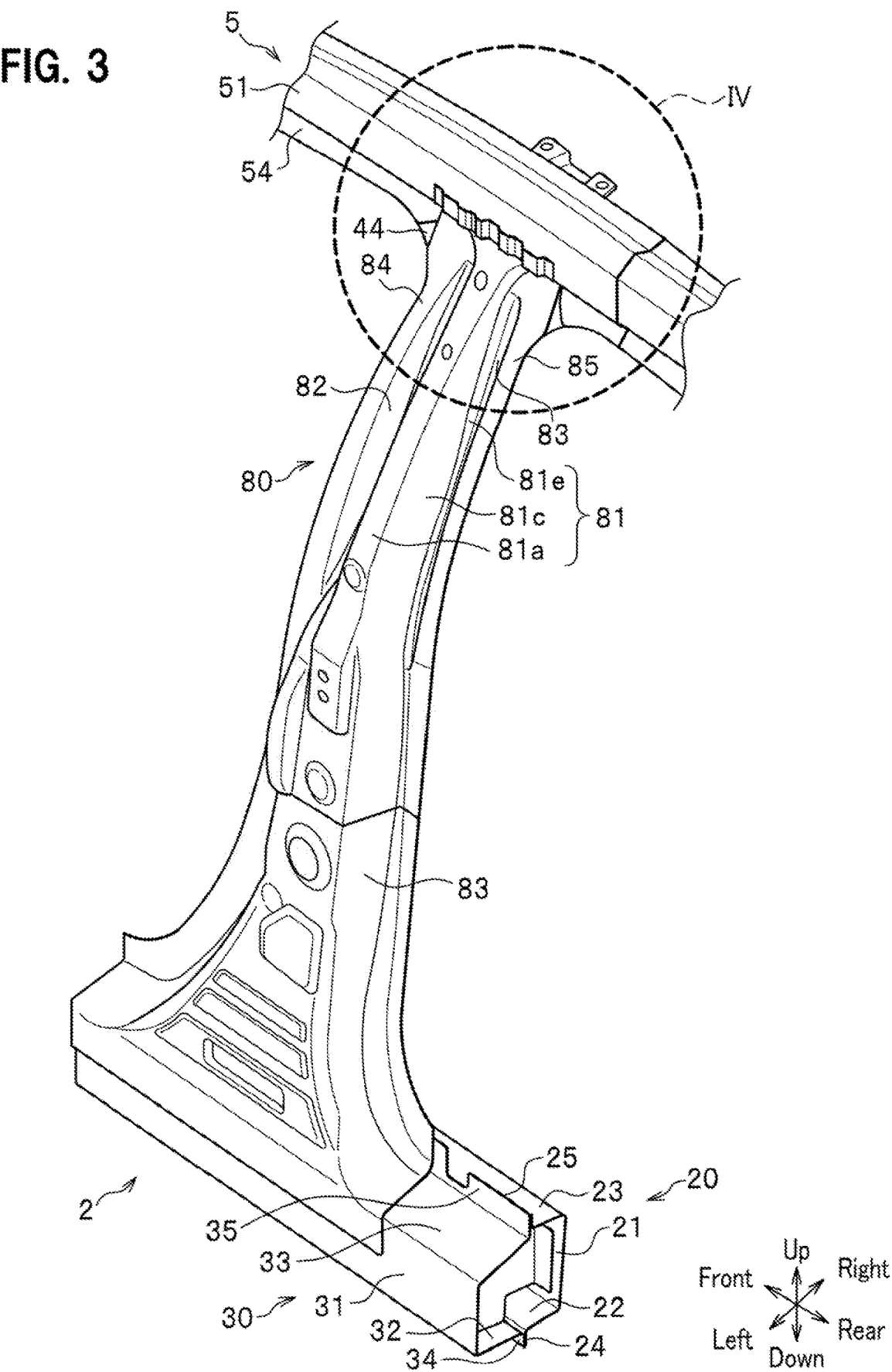
FIG. 3 is a diagram schematically showing the vehicle body side structure according to the embodiment of the present invention, which is a perspective view from outside of the vehicle on the rear side while detaching a center pillar inner member and a center pillar outer member.

The stiffener 80 is a metallic reinforcing member inserted between the center pillar inner member 60 and the center pillar outer member 70. As shown in FIG. 3, the stiffener 80 is integrally provided with a wall portion 81 that extends in the front-rear direction and in the up-down direction, a front wall portion 82 that extends from a front end portion of the wall portion 81, and a rear wall portion 83 that extends from a rear end portion of the wall portion 81. Moreover, the stiffener 80 is integrally provided with a flange portion 84 that extends forward from a front end portion of the front wall portion 82, and a flange portion 85 that extends rearward from a front end portion of the rear wall portion 83.

Each of the flange portion 64, the flange portion 74, and the flange portion 84 includes joining portions to which at least two components are joined by welding or the like. Such joining portions are provided at multiple locations arranged in the up-down direction along each of the flange portions 64, 74, and 84. Each of the flange portion 65, the flange portion 75, and the flange portion 85 includes joining portions to which at least two components are joined by welding or the like. Such joining portions are provided at multiple locations arranged in the up-down direction along each of the flange portions 65, 75, and 85.

A lower end portion of the inner wall portion 61 of the center pillar inner member 60 is sandwiched by the flange portion 25 and the flange portion 35. A lower end portion of the outer wall portion 71 of the center pillar outer member 70 and a lower end portion of the wall portion 81 of the stiffener 80 are joined by welding or the like to an outer surface in the vehicle width direction of the outer wall portion 31 of the side sill outer member 30. Lower end portions of the front wall portion 82 and the rear wall portion 83 of the stiffener 80 are joined by welding or the like to an upper surface of the upper wall portion 33 of the side sill outer member 30. Lower end portions of the flange portions 84 and 85 of the stiffener 80 are joined by welding or the like to an outer surface in the vehicle width direction of the flange portion 35 of the side sill outer member 30. An upper end portion of the outer wall portion 71 of the center pillar outer member 70 is formed integrally with the roof side rail 5 and is thus joined to the roof side rail 5. The roof side rail 5 is formed in a bent manner so as to serve as a cover from outside in the vehicle width direction and from above, and is joined by welding or the like to the roof panel 6.

<<Upper End Portion of Stiffener>>

Figure 4:
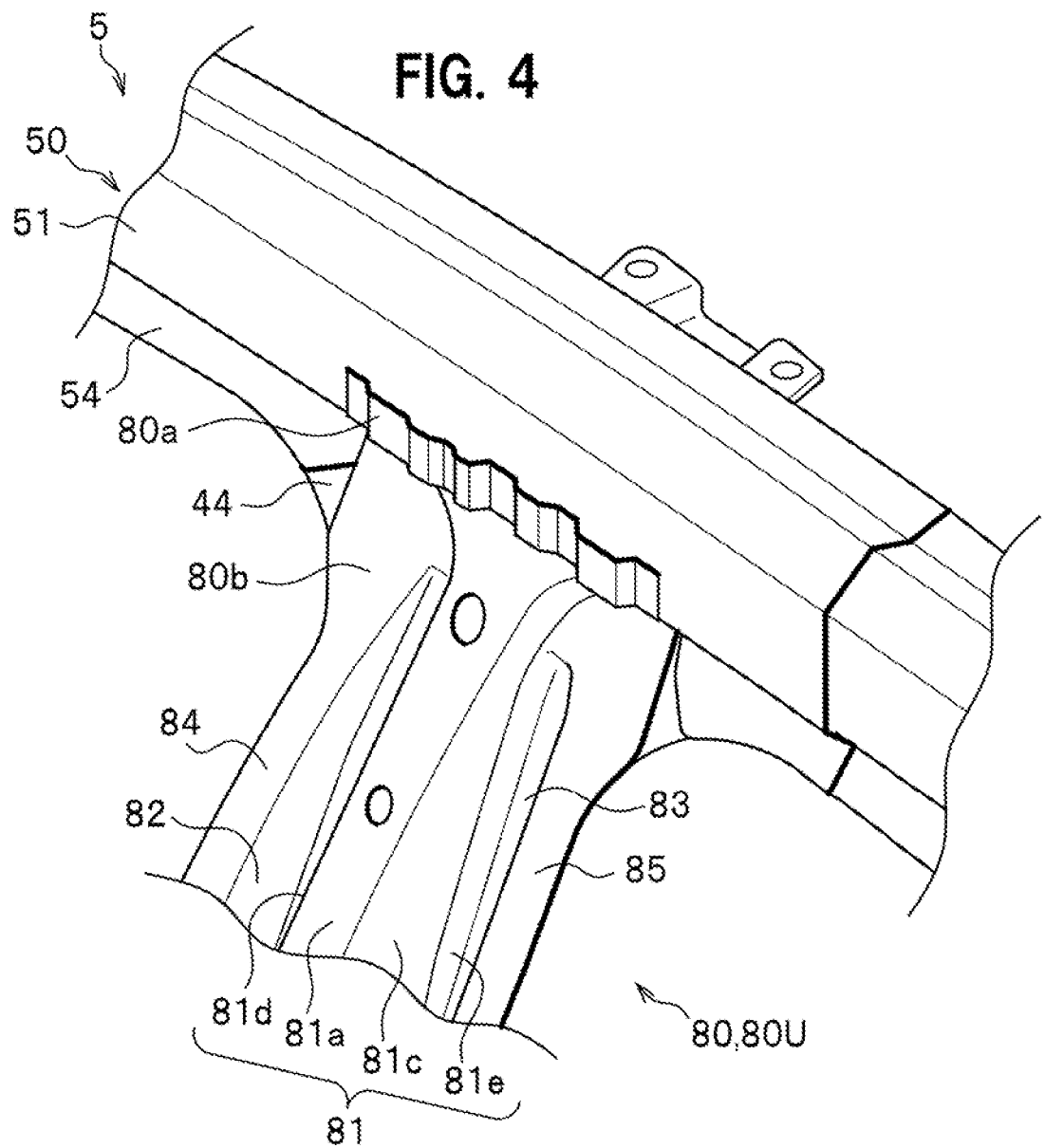
FIG. 4 is an enlarged diagram of a portion IV in FIG. 3.

As shown in FIG. 4, an upper end portion of the stiffener 80 does not have trough portions 81d and 81e to be described later in the wall portion 81 that extends in the front-rear direction and in the up-down direction. Specifically, at the upper end portion of the stiffener 80, the trough portion 81d is flattened as its groove portion formed in cooperation with a joining wall portion 81b and the front wall portion 82 is flattened due to the joining wall portion 81b and the front wall portion 82 gradually diminishing toward to the flange portion 84. Hence, the trough portion 81d becomes flush with the flange portion 84. Meanwhile, at the upper end portion of the stiffener 80, the trough portion 81e is flattened as its groove portion formed in cooperation with a joining wall portion 81c and the rear wall portion 83 is flattened due to the joining wall portion 81c and the rear wall portion 83 gradually diminishing toward to the flange portion 85. Hence, the trough portion 81e becomes flush with the flange portion 85.

An upper part 80a of the upper end portion of the stiffener 80 is joined by welding or the like to an outer surface in the vehicle width direction of the outer wall portion 51 of the roof side rail outer member 50. A lower part 80b of the upper end portion of the stiffener 80 is joined by welding or the like to an outer surface in the vehicle width direction of the flange portion 44 of the roof side rail inner member 40 and to an outer surface in the vehicle width direction of the flange portion 54 of the roof side rail outer member 50.

As described above, the upper end portion of the stiffener 80 is joined to the roof side rail 5 from the outer side in the vehicle width direction. Accordingly, in case of an input of a side impact load to the center pillar 8, the side impact load is propagated in a direction of compression sequentially from the stiffener 80 to the roof side rail 5. As a consequence, the joined part of the stiffener 80 and the roof side rail 5 by welding or the like is less likely to come off.

<<Form of Stiffener (Above Beltline)>>

As shown in FIGS. 5 to 8, a super-beltline portion of the stiffener 80 (which is above the beltline BL; a region of the stiffener 80 constituting the super-beltline portion will be hereinafter also referred to an upper stiffener portion 80U) substantially takes on a W-shape in plan view.

The wall portion 81 is integrally provided with a crest wall portion (a crest portion) 81a which represents an intermediate portion in the front-rear direction, the joining wall portion (a leg portion) 81b that extends inward in the vehicle width direction from a front end portion of the crest wall portion 81a, and the joining wall portion (a leg portion) 81c that extends inward in the vehicle width direction from a rear end portion of the crest wall portion 81a. Moreover, the wall portion 81 is integrally provided with the trough portion 81d that extends forward from an inner end portion in the vehicle width direction of the joining wall portion 81b, and the trough portion 81e that extends rearward from an inner end portion in the vehicle width direction of the joining wall portion 81c. In other words, the crest wall portion 81a bulges outward in the vehicle width direction relative to the pair of front and rear trough portions 81d and 81e, while the pair of front and rear trough portions 81d and 81e are recessed inward in the vehicle width direction relative to the crest wall portion 81a.

A front end portion of the trough portion 81d is joined to the front wall portion 82, and a rear end portion of the trough portion 81e is joined to the rear wall portion 83.

The crest wall portion 81a is opposed to (or preferably is in contact with) an inner surface in the vehicle width direction of the outer wall portion 71 of the center pillar outer member 70.

Figure 5:
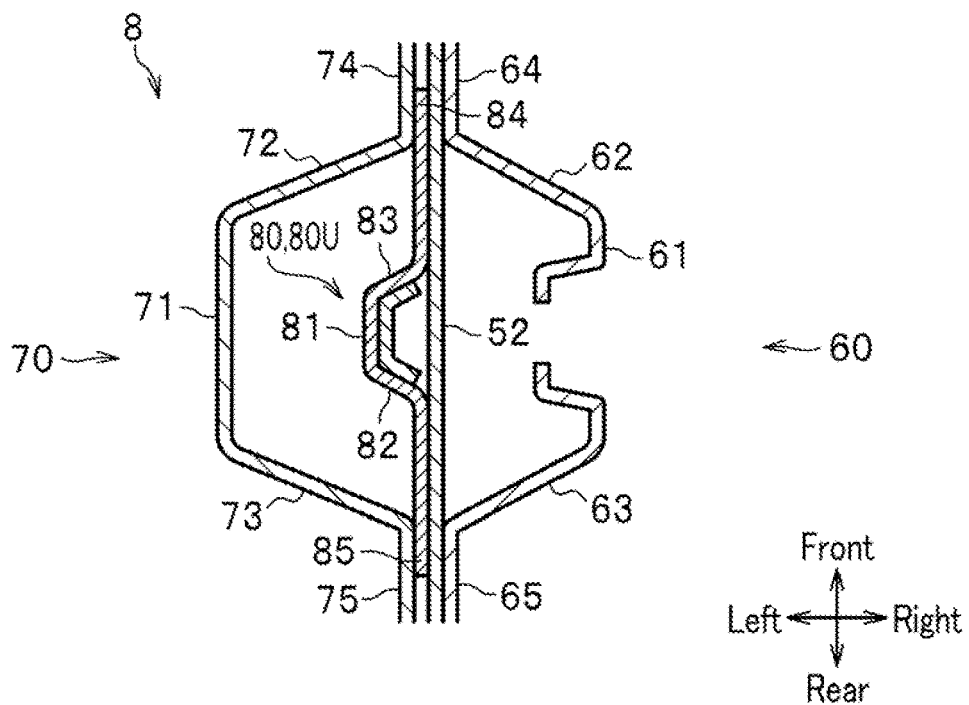
FIG. 5 is a cross-sectional view taken along the V-V line in FIG. 2.
Figure 6:
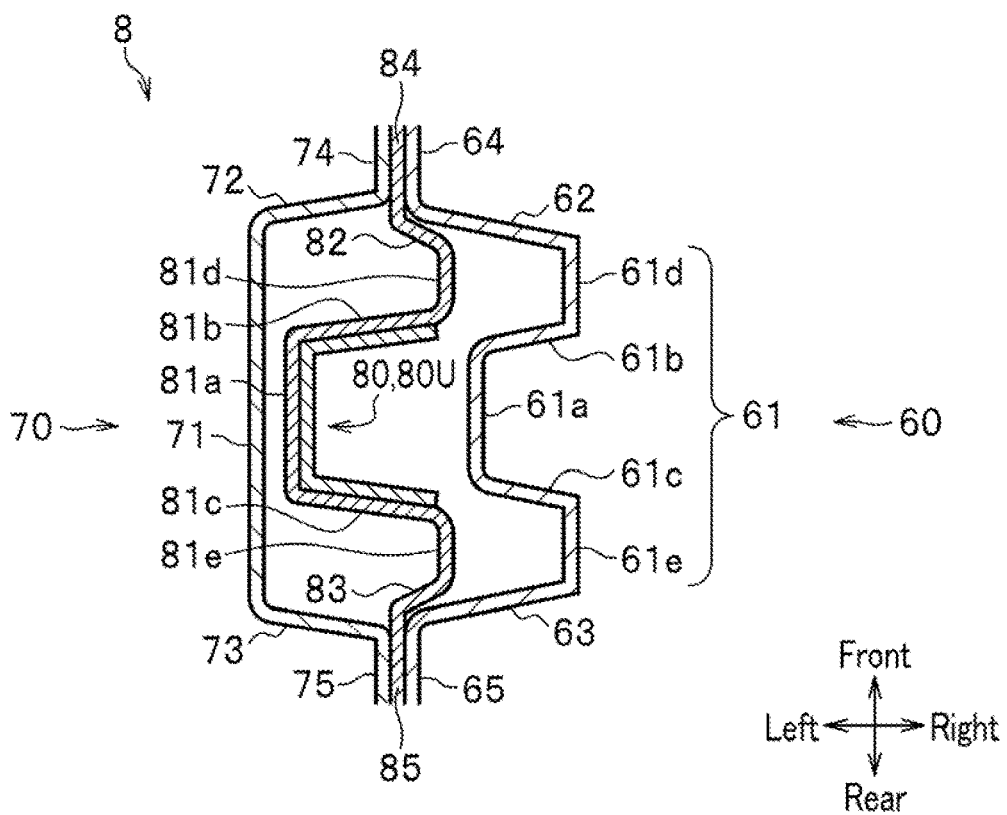
FIG. 6 is a cross-sectional view taken along the VI-VI line in FIG. 2.

The pair of front and rear trough portions 81d and 81e are formed at least between the super-beltline portion of the stiffener 80 (above the beltline BL) and the upper end portion (in the vicinity) thereof, and are gradually flattened on the crest wall portion 81a side in a range from the beltline BL and the upper end portion of the stiffener 80 (see the upper portion in FIG. 5). The pair of front and rear trough portions 81d and 81e form the deepest portion A1 which is the deepest in terms of a height between the beltline BL and the upper end portion of the stiffener 80 (see FIG. 7). Moreover, the pair of front and rear trough portions 81d and 81e form gradually changed portions A2 and A3 in which the recesses in the vehicle width direction become gradually shallower from the deepest portion A1 toward the beltline BL and the upper end portion of the stiffener 80 (see FIGS. 6 and 8).

Figure 7:
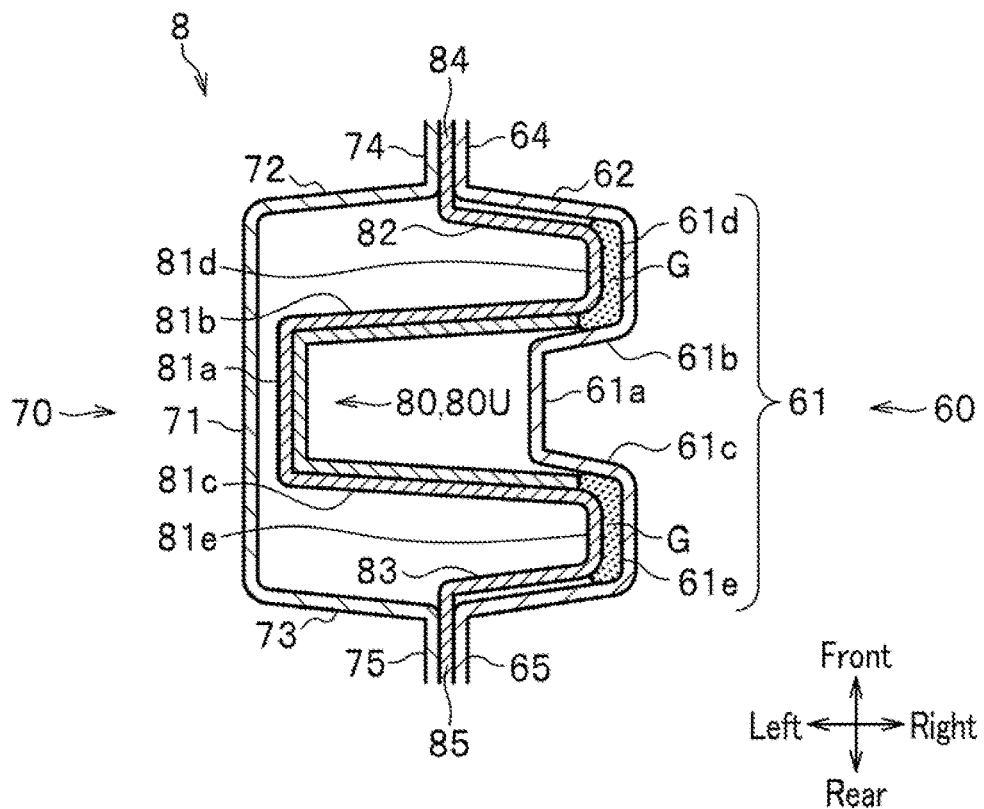
FIG. 7 is a cross-sectional view taken along the VII-VII line in FIG. 2.
Figure 8:
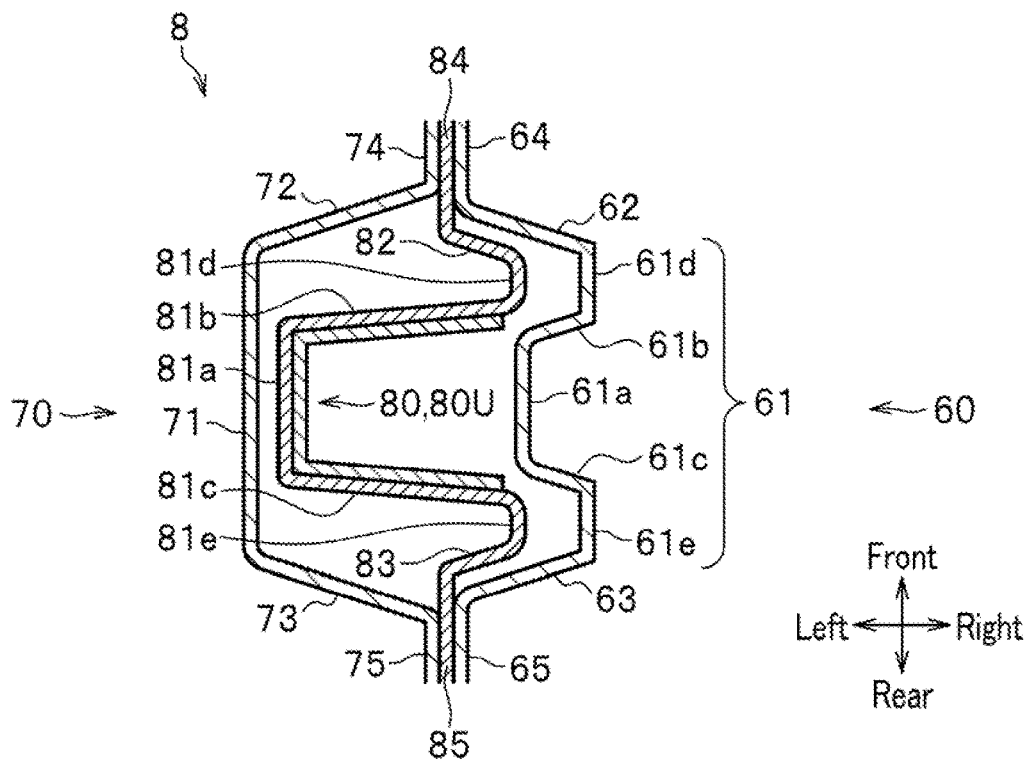
FIG. 8 is a cross-sectional view taken along the VIII-VIII line in FIG. 2.

As shown in FIG. 7, the pair of front and rear trough portions 81d and 81e are attached and joined to the inner wall portion 61 of the center pillar inner member 60 at the deepest portion A1 by using an adhesive (an adhesive layer) G.

When the trough portions 81d and 81e and the trough wall portions 61d and 61e come into close contact with one another, the extra adhesive G is pushed out of the close contact portions and moves to voids around the closer contact portions. Accordingly, the adhesive G spreads beyond bent portions (curved ridge line portions) where the front end portions and the rear end portions of the trough portions 81d and 81e and of the trough wall portions 61d and 61e cross one another, thereby attaching the joining wall portion 81b to the side wall 61b, the front wall portion 82 to the front wall portion 62, the joining wall portion 81c to the side wall 61c, and the rear wall portion 83 to the front wall portion 62, respectively (see FIG. 7).

The adhesive G is a structural adhesive which is desirably of a high toughness type or a high viscosity type. When the adhesive G is of the high toughness type, it is possible to suitably prevent the adhesive from being cracked in case of torsion and the like of the vehicle body, thus improving durability of the adhesion. When the adhesive G is of the high viscosity type, the adhesive G is kept from dripping off even when the adhesive G is applied to bulging regions such as the trough portions 81d and 81e.

<<Form of Stiffener (Below Beltline)>>

Figure 9:
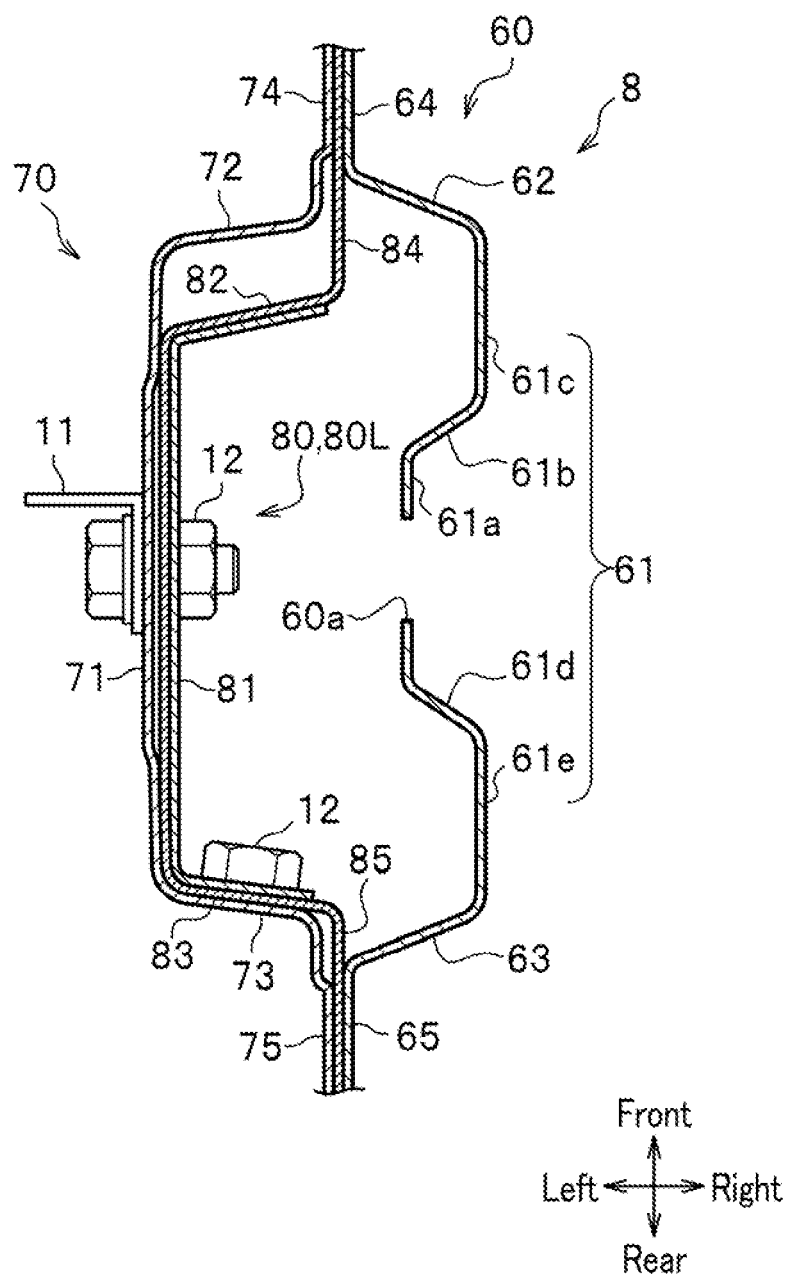
FIG. 9 is a cross-sectional view taken along the IX-IX line in FIG. 2.
Figure 10:
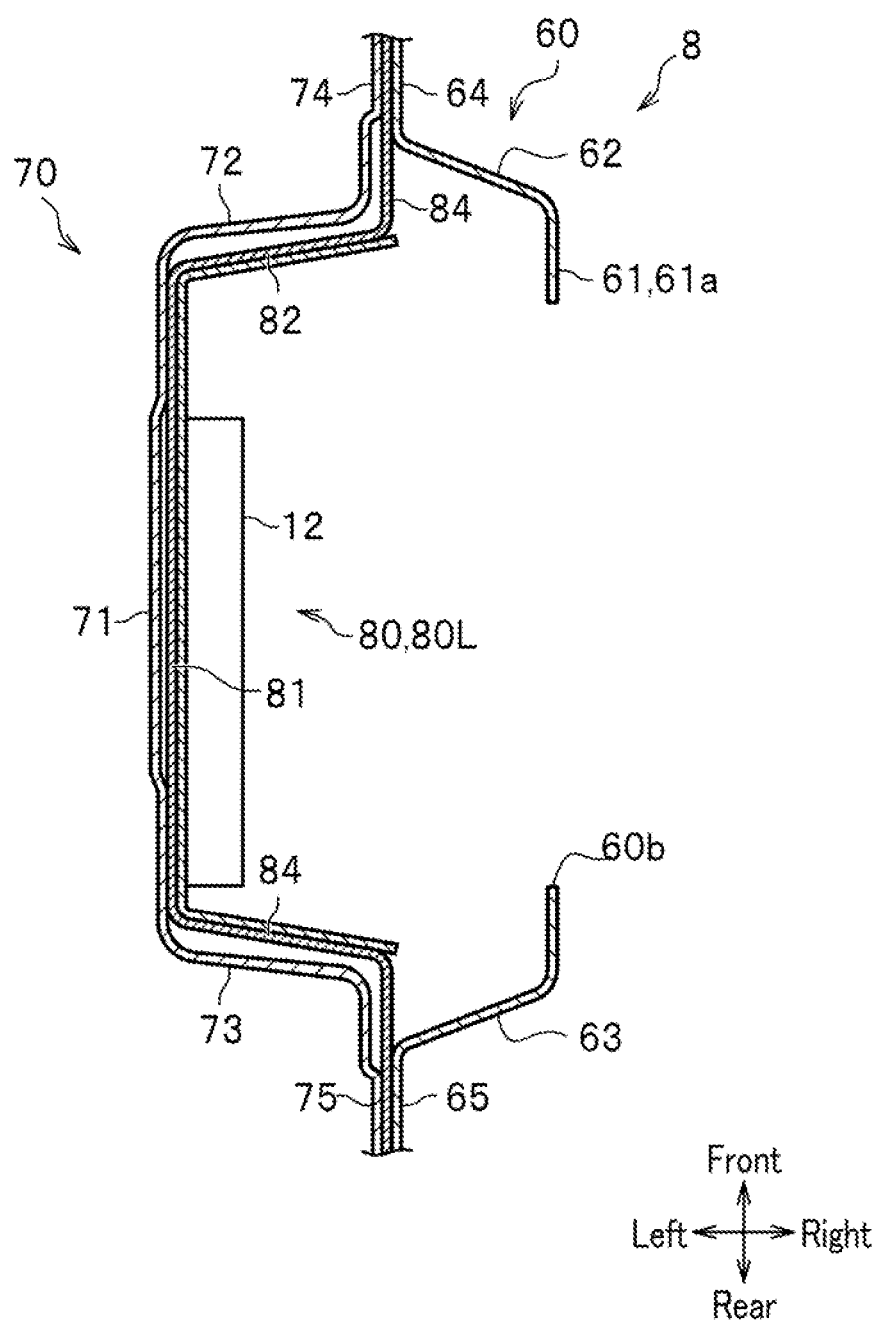
FIG. 10 is a cross-sectional view taken along the X-X line in FIG. 2.

As shown in FIGS. 9 and 10, a sub-beltline portion of the stiffener 80 (which is below the beltline BL; a region of the stiffener 80 constituting the sub-beltline portion will be hereinafter also referred to a lower stiffener portion 80L) substantially takes on a hat-like shape in plan view. Specifically, the joining wall portions 81b and 81c are located away from each other while the recesses in the vehicle width direction of each of the trough portions 81d and 81e becomes gradually shallower. Thus, regions previously serving as the joining wall portions 81b and 81c constitute the front wall portion 82 and the rear wall portion 83 that join the wall portion 81 (the crest wall portion 81a) to the flange portions 84 and 85.

As shown in FIG. 9, in-vehicle components (nuts) 12 are provided to the inner wall portion (the vehicle-widthwise inner wall portion) 81 and the rear wall portion 83 of the stiffener 80 while an in-vehicle component (such as a door hinge bracket) 11 is fastened (fixed by bolt fastening, for instance) to the outer wall portion 71 and the rear wall portion 73 of the center pillar outer member 70.

Plate thicknesses of the joining wall portions 81b and 81c are preferably larger than a plate thickness of at least one of the crest wall portion 81a and the trough portions 81d and 81e.

In this embodiment, the plate thicknesses of the joining wall portions 81b and 81c are larger than the plate thicknesses of the trough portions 81d and 81e.

<Seat Attachment Bracket>

As shown in FIGS. 1 and 2, the seat attachment bracket 9 is a bracket to which a seat in a vehicle interior is attached. The seat attachment bracket 9 is a metallic framework member configured to reinforce a corner portion, which is formed from the side sill inner member 20 and an end portion in the vehicle width direction of the cross member 4 in front view.

The seat attachment bracket 9 takes on a substantially U-shaped cross-sectional shape with an opening on a lower side in side view, and also takes on a substantially U-shaped cross-sectional shape with an opening on an outer side in the vehicle width direction in plan view. A lower end portion of the seat attachment bracket 9 is joined by welding or the like to the cross member 4, while an outer end portion in the vehicle width direction of the seat attachment bracket 9 is joined by welding or the like to the side sill inner member 20.

<Roof Arch Connection Bracket>

The roof arch connection bracket 10 is a bracket to connect the center pillar inner member 60 to the roof arch 7. The roof arch connection bracket 10 is a metallic framework member configured to reinforce a corner portion, which is formed from the center pillar inner member 60 and an end portion in the vehicle width direction of the roof arch 7 in front view. The roof arch connection bracket 10 takes on a substantially U-shaped cross-sectional shape with an opening on an upper side in side view, and also takes on a substantially U-shaped cross-sectional shape with an opening on an outer side in the vehicle width direction in plan view. An upper end portion of the roof arch connection bracket 10 is joined by welding or the like to the roof arch 7, while an outer end portion in the vehicle width direction of the bracket 10 is joined by welding or the like to an upper end portion of the center pillar inner member 60.

<Method of Manufacturing Center Pillar>

Next, a method of manufacturing the center pillar 8 according to the embodiment of the present invention will be described. In the method of manufacturing the center pillar 8, the center pillar inner member 60 is engaged with the side sill 2 to form an assembly of an inner framework member of the vehicle. The center pillar outer member 70 and the center pillar inner member 60 that constitute the outer surface of the vehicle are engaged with the aforementioned assembly of the inner framework member.

<First Step>

Figure 11:
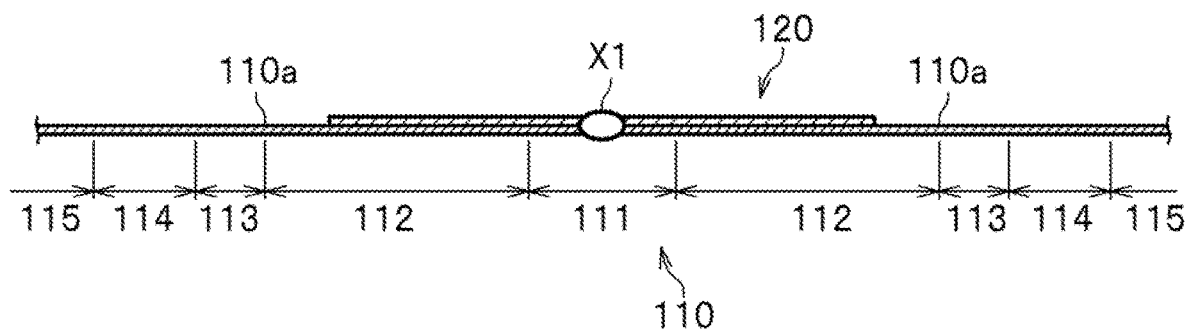
FIG. 11 is a schematic diagram for explaining a first step in a center pillar manufacturing method according to the embodiment of the present invention.

As shown in FIG. 11, a worker (alternatively, a work robot or the like; the same applies hereinafter) stacks a primary steel plate 110 and a secondary steel plate 120 and temporarily joins the primary steel plate 110 to the secondary steel plate 120 thus stacked (a first step).

<<Primary Steel Plate>>

The primary steel plate 110 is a member for forming a body portion of the stiffener 80. The primary steel plate 110 is integrally provided with a projected crest portion 111 projected to be formed into the crest portion 81a, projected joining wall portions 112 projected to be formed into the joining wall portions 81b and 81c, and projected trough portions 113 projected to be formed into the trough portions 81*d* and 81*e* in the area between the beltline BL and the upper end portion of the center pillar 8 in particular. Moreover, the primary steel plate 110 is integrally provided with projected front-rear wall portions 114 projected to be formed into the front wall portion 82 and the rear wall portion 83, and projected flange portions 115 projected to be formed into the flange portions 84 and 85, which are located in an area between the beltline BL and the upper end portion of the center pillar 8 in particular.

<<Secondary Steel Plate>>

The secondary steel plate 120 is a member for reinforcing the stiffener 80. The secondary steel plate 120 is stacked on the projected crest portion 111 and the projected joining wall portions 112 in the area between the beltline BL and the upper end portion of the center pillar 8 in particular. In this embodiment, two end portions of the secondary steel plate 120 are located more inward (toward the projected crest portion 111 side) than projected bent portions 110*a* between the projected joining wall portions 112 and the projected trough portions 113. In other words, the secondary steel plate 120 extends across the crest portion of the primary steel plate 110 and has a shorter length than a length between bottom surfaces of the trough portions.

Although illustration is omitted, the secondary steel plate 120 is stacked on the projected crest portion 111 and on the projected front-rear wall portions 114 at the portion of the center pillar 8 below the beltline BL.

The secondary steel plate 120 is temporarily joined by spot welding or the like to the crest wall portion 81*a* of the primary steel plate 110 (see a temporarily joined region X1 in FIG. 11). Alternatively, the secondary steel plate 120 may be designed to be temporarily joined to the pair of projected joining wall portions 112 of the primary steel plate 110 by spot welding or the like. Such a temporary joining method is not limited only to the spot welding but may be any of adhesion, clamping, and the like.

<Second Step>

Figure 12:
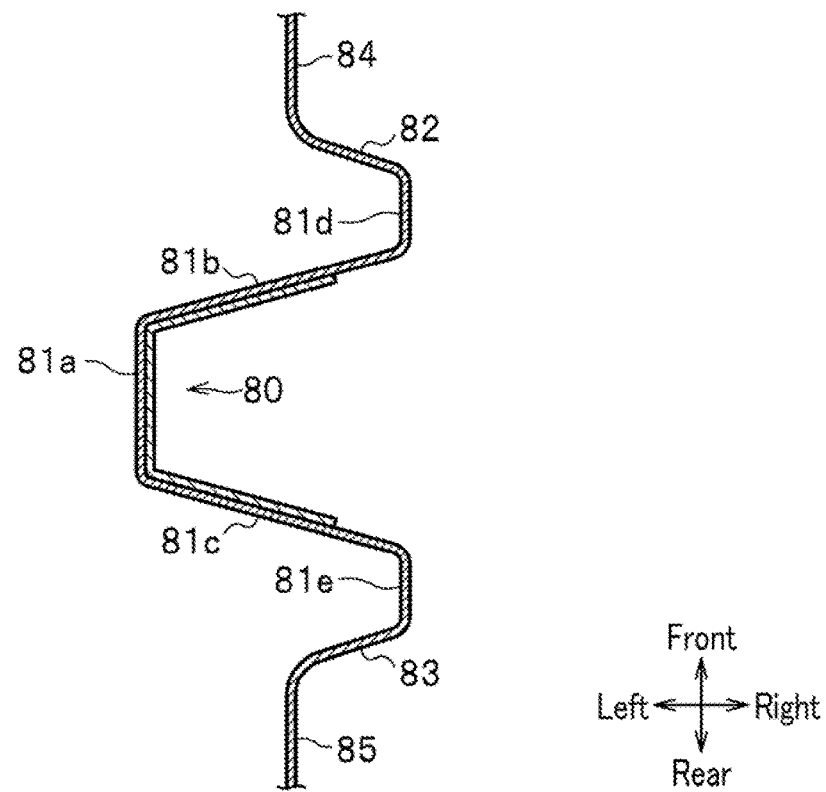
FIG. 12 is a schematic diagram for explaining a second step in the center pillar manufacturing method according to the embodiment of the present invention.

Next, as shown in FIG. 12, the worker subjects the primary steel plate 110 and the secondary steel plate 120, which are stacked and temporarily joined, to hot press (press-molding and quenching), thus forming the stiffener 80 by integrally molding the primary steel plate 110 and the 120 (a second step). The crest wall portion 81*a* is formed over a region from a lower end portion to the upper end portion of the stiffener 80 (see FIGS. 5 to 10). The pair of trough portions 81*d* and 81*e* are formed over a region from the beltline BL of the center pillar 8 to the upper end of the stiffener 80 (see FIGS. 5 to 8). Moreover, the pair of trough portions 81*d* and 81*e* are flattened at the upper end portion of the stiffener 80 due to the joining wall portions 81*b* and 81*c* as well as the front wall portion 82 and the rear wall portion 83 gradually diminishing toward to the flange portion 84. Accordingly, the upper end portion of the stiffener 80 takes on such a shape that facilitates the joining to the roof side rail 5.

<Third Step>

Figure 13:
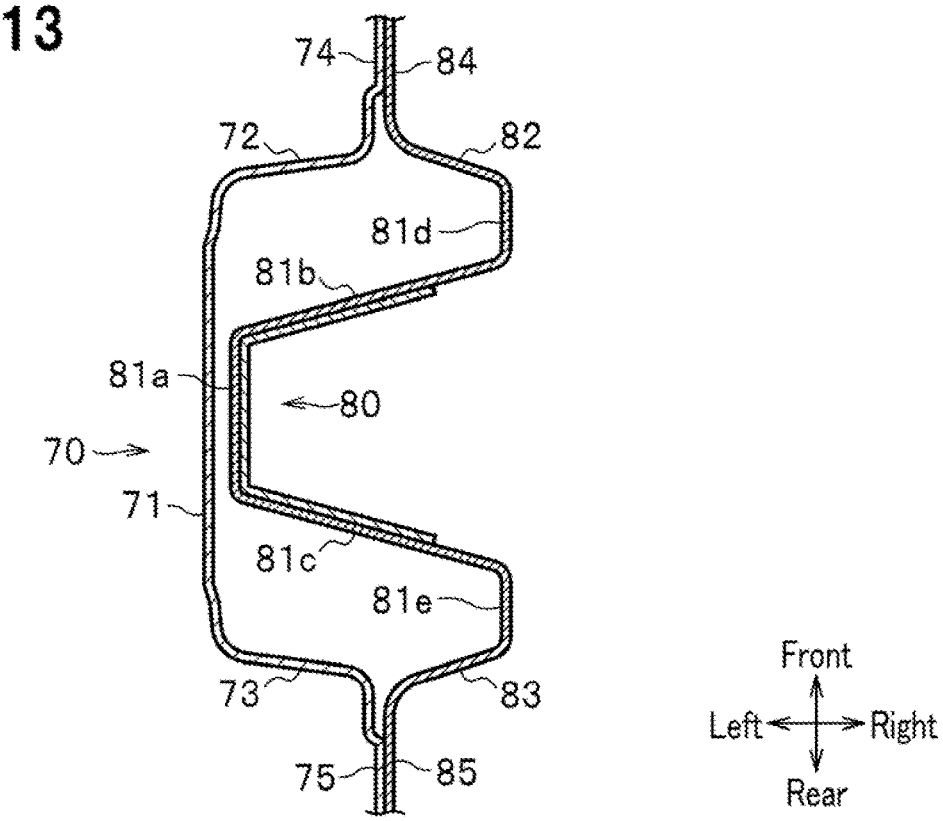
FIG. 13 is a schematic diagram for explaining a third step in the center pillar manufacturing method according to the embodiment of the present invention.

Subsequently, as shown in FIG. 13, the worker joins the center pillar outer member 70 to the stiffener 80 (a third step). Here, the flange portion 74 of the center pillar outer member 70 is joined by welding or the like to the flange portion 84 of the stiffener 80, and the flange portion 75 of the center pillar outer member 70 is joined by welding or the like to the flange portion 85 of the stiffener 80.

In the meantime, along with the execution of the third step, the front wall portion 82 of the stiffener 80 is opposed to the front wall portion 72 of the center pillar outer member 70 while the rear wall portion 83 of the stiffener 80 is opposed to the rear wall portion 73 of the center pillar outer member 70 at the portion of the center pillar 8 below the beltline BL.

<Fourth Step>

Figure 14:
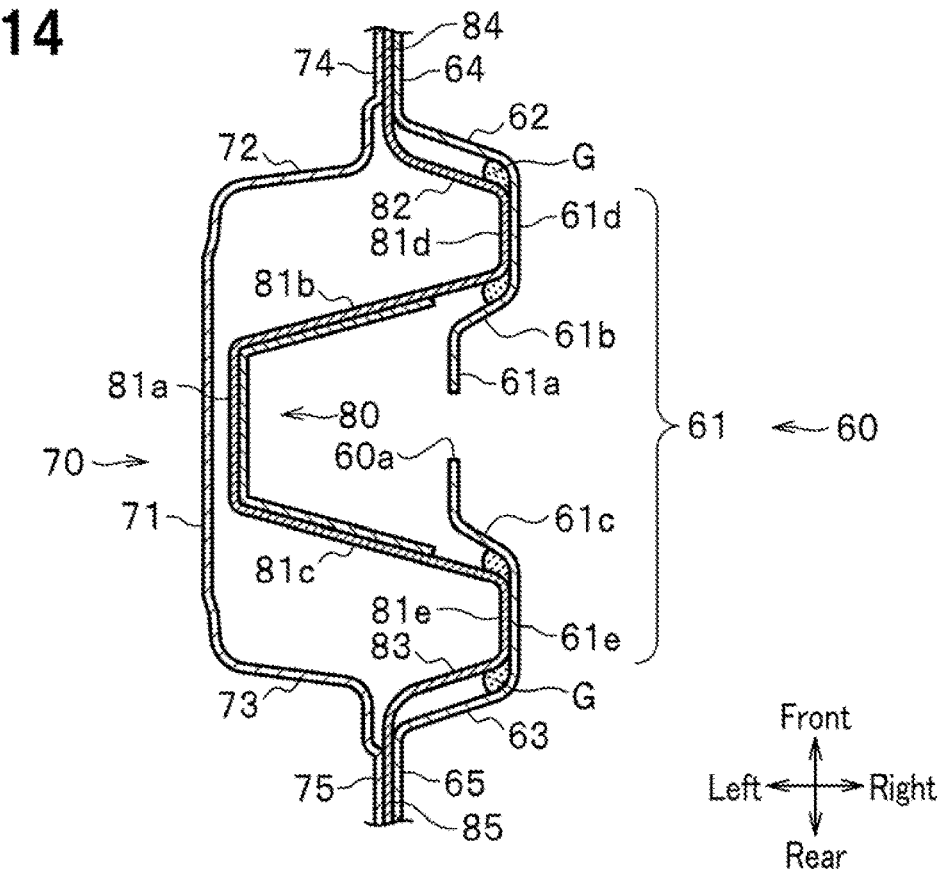
FIG. 14 is a schematic diagram for explaining a fourth step in the center pillar manufacturing method according to the embodiment of the present invention.
Figure 15:
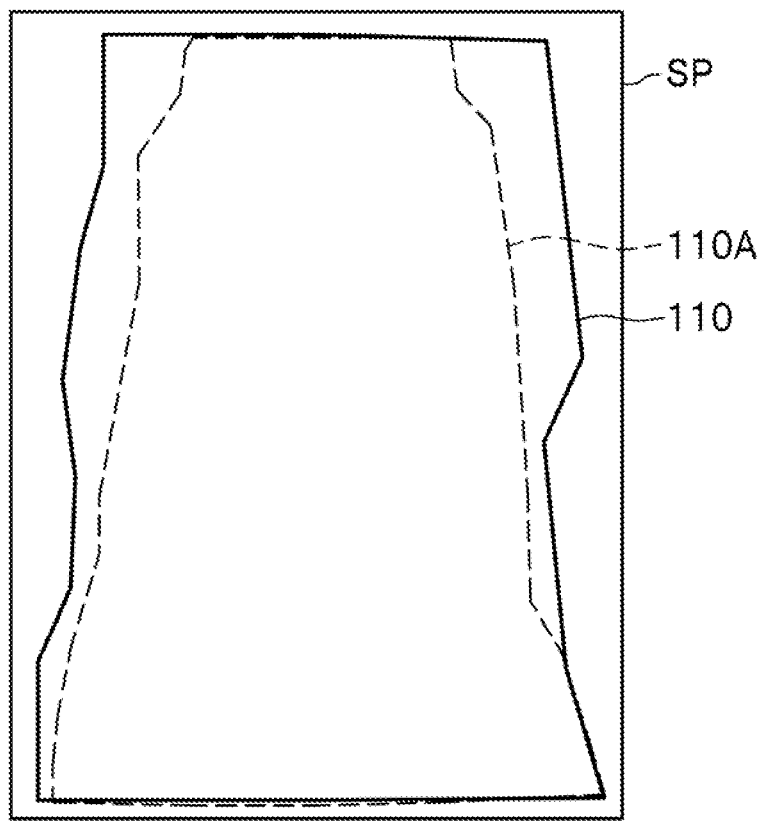
FIG. 15 is a schematic diagram for explaining a yield rate of a primary steel plate.

Next, as shown in FIG. 14, the worker joins the assembly of the center pillar outer member 70 and the stiffener 80 to the center pillar inner member 60 (a fourth step). Here, the flange portion 64 of the center pillar inner member 60 is joined by welding or the like to the flange portions 74 and 84 of the assembly, and the flange portion 65 of the center pillar inner member 60 is joined by welding or the like to the flange portions 75 and 85 of the assembly. Meanwhile, at the deepest portion A1 (see FIG. 2), the trough wall portion 61*d* of the center pillar inner member 60 is joined to the trough portion 81*d* of the stiffener 80 by using the adhesive G, and the trough wall portion 61*e* of the center pillar inner member 60 is joined to the trough portion 81*e* of the stiffener 80 by using the adhesive G. At a stage before the joining, the adhesive G may be applied to the trough wall portions 61*d* and 61*e* of the center pillar inner member 60 or applied to the trough portions 81*d* and 81*e* of the stiffener 80. Here, as the trough portions 81*d* and 81*e* come into close contact with the trough wall portions 61*d* and 61*e*, the extra adhesive G is pushed out of the close contact portions and runs to the gradually changed portions A2 and A3. As a consequence, an adhesion thickness and an adhesion area of the adhesive G at each of the trough portions 81*d* and 81*e* are kept constant.

In the meantime, along with the execution of the fourth step, the wall portion 81 (the crest wall portion 81*a*) of the stiffener 80 is opposed to (or preferably is in contact with) the outer wall portion 71 of the center pillar outer member 70 at the portion of the center pillar 8 below the beltline BL.

<Fifth Step>

At a point between the second step and the third step or a point between the third step and the fourth step, the worker may attach the in-vehicle components 12 (see FIGS. 9 and 10) to the secondary steel plate 120 at the portion of the center pillar 8 below the beltline BL in particular (a fifth step). For example, the in-vehicle components 12 (such as bolts and nuts) may be attached to the secondary steel plate 120 and a not-illustrated hinge of a side door (a rear door) on the rear side of the center pillar 8 may be attached to a region of the rear wall portion 73 corresponding to the secondary steel plate 120 (see FIG. 9). Alternatively, the in-vehicle components 12 (latches) of the side door (the rear door) on the rear side of the center pillar 8 may be attached to a region of the secondary steel plate 120 corresponding to the wall portion 81 (the crest wall portion 81*a*) (see FIG. 10). Meanwhile, although illustration is omitted, a hinge of a side door (a front door) on the front side of the center pillar 8 may be attached as the in-vehicle component 11 to a region of the front wall portion 72 corresponding to the secondary steel plate 120. The in-vehicle components 12 are attached to the secondary steel plate 120 (and to the primary steel plate 110) by bolt fastening, adhesion, swaging, and the like.

In the meantime, the primary steel plate 110 substantially takes on the W-shape having the crest wall portion 81*a* and the pair of trough portions 81*d* and 81*e* between the beltline BL and the upper end portion of the center pillar 8, and substantially takes on the hat-like shape below the beltline BL of the center pillar 8. Accordingly, as compared to a primary steel plate 110A of a comparative example that substantially takes on a hat-like shape in the aforementioned regions, the primary steel plate 110 can subject a steel plate SP at the super-beltline portion to hot press-molding and effectively utilize the steel plate SP as the stiffener 80, thereby improving a yield rate.

The method of manufacturing the center pillar 8 according to the embodiment of the present invention is a method of manufacturing the center pillar 8 of the vehicle provided with the stiffener 80 having the substantially W-shaped cross-section formed from the crest portion (the crest wall portion 81a) and the pair of trough portions 81d and 81e provided on two sides of the crest portion. The method includes: the first step of stacking the primary steel plate 110 and the secondary steel plate 120 extending across the crest portion (the projected crest portion 111) of the primary steel plate 110 and having the shorter length than the length between the bottom surfaces (the projected trough portions 113) of the trough portions 81d and 81e, and temporarily joining the primary steel plate 110 to the secondary steel plate 120; the second step of forming the stiffener 80 by press-molding and quenching the primary steel plate 110 substantially into the W-shape and press-molding and quenching the secondary steel plate 120 substantially into the U-shape; the third step of joining the flange portions 74 and 75 of the pillar outer member (the center pillar outer member 70) having the outer wall portion in the vehicle width direction of the center pillar 8 to the flange portions 84 and 85 of the stiffener 80; and the fourth step of joining the pillar inner member (the center pillar inner member 60) having the inner wall portion in the vehicle width direction of the center pillar to the pillar outer member after joining the stiffener 80 in such a way as to sandwich the flange portions 84 and 85 of the stiffener 80 with the flange portions 64 and 65 of the pillar inner member and the flange portions 74 and 75 of the pillar outer member.

As a consequence, the method of manufacturing the center pillar 8 can prevent displacement between the primary steel plate 110 and the secondary steel plate 120 during a pressing process or the like when a blank material (the temporarily joined unit of the primary steel plate 110 and the secondary steel plate 120) is conveyed or set on molds.

Moreover, according to the method of manufacturing the center pillar 8, the secondary steel plate 120 serves as the U-shaped reinforcing member that reinforces the crest portion and the pair of leg portions of the primary steel plate 110. Thus, it is possible to form the leg portions by using a thick plate portion where the primary steel plate 110 overlaps the secondary steel plate 120, thereby improving a resisting effect of the leg portions against a side impact load and suppressing collapse deformation of the leg portions.

Furthermore, according to the method of manufacturing the center pillar 8, the primary steel plate 110 is substantially press-molded into the W-shape while the secondary steel plate 120 is substantially press-molded into the U-shape. Thus, the secondary steel plate 120 does not extend to the trough portions where a contribution rate to the side impact load is low so that the secondary steel plate 120 can be reduced in size and weight. In addition, since each trough portion is formed from the first steel plate alone, it is possible to realize the complex W-shape by hot press-molding.

Meanwhile, the method of manufacturing the center pillar 8 is characterized in that the stiffener 80 includes the pair of leg portions 81b and 81c that join the crest portion to the pair of trough portions 81d and 81e, respectively, and that the secondary steel plate 120 is temporarily joined to at least any of the projected portion for the crest portion and the pair of projected portions for the leg portions in the first step.

As a consequence, the method of manufacturing the center pillar 8 can prevent the displacement by temporarily joining the secondary steel plate 120 to the projected portion for the crest portion, for example, thereby favorably bending the secondary steel plate 120 around the projected portion for the crest portion and in conformity to the leg portions by hot press-molding.

In the meantime, when the secondary steel plate 120 is temporarily joined to the pair of projected portions for the leg portions, for example, the method of manufacturing the center pillar 8 can favorably position and fix the two end portions of the secondary steel plate 120 to the primary steel plate 110, thereby preventing detachment of the secondary steel plate 120 from the leg portions in case of the side impact load.

In addition, in contrast to a case of bending the primary steel plate 110 and the secondary steel plate 120 and then engaging and fixing these steel plates together, the method of manufacturing the center pillar 8 can fix the secondary steel plate 120 to the primary steel plate 110 (to the projected portions for the leg portions in particular) before bending the steel plates. Thus, it is possible to join the secondary steel plate 120 to the leg portions of the primary steel plate 110 without being affected by the bent shapes of the steel plates, thereby favorably suppressing the collapse deformation of the leg portions against the side impact load.

Meanwhile, the method of manufacturing the center pillar 8 is characterized in that the stiffener 80 includes the pair of leg portions 81b and 81c that join the crest portion to the pair of trough portions 81d and 81e, respectively, and that the secondary steel plate 120 is disposed inside the pair of projected bent portions 110a, which are formed between the pair of projected portions for the trough portions and the pair of projected portions for the leg portions, respectively in the first step.

As a consequence, the method of manufacturing the center pillar 8 can press-mold the trough portions of the stiffener 80 by using the primary steel plate 110 alone since the secondary steel plate 120 is not provided at the projected portions for the trough portions of the primary steel plate 110, thereby improving press-molding efficiency of the trough portions.

Meanwhile, the method of manufacturing the center pillar 8 is characterized in that the crest portion is formed from the lower end portion to the upper end portion of the stiffener 80 and the pair of trough portions 81d and 81e are formed from a heightwise intermediate portion to the upper end portion of the stiffener 80 in the second step.

As a consequence, according to the method of manufacturing the center pillar 8, the upper portion of the stiffener 80 substantially takes on the W-shape while the lower portion thereof substantially takes on the hat-like shape. Thus, it is possible to reduce a difference in cross-sectional perimeter length between the upper and lower portions of the stiffener 80, thereby improving the yield rate and reinforcing the upper portion of the center pillar 8.

Meanwhile, the method of manufacturing the center pillar 8 is characterized in that the pair of trough portions 81d and 81e are formed in the second step in such a way as to be gradually flattened toward the flange portions 84 and 85 of the stiffener 80 at the upper end portion of the stiffener 80.

As a consequence, according to the method of manufacturing the center pillar 8, the pair of trough portions 81d and 81e are flattened toward the flange portions 84 and 85 at the upper end portion of the stiffener 80 whereby the joining portion is expanded. Thus, it is possible to form the shape that is easily joined to the roof side rail 5.

Meanwhile, the method of manufacturing the center pillar 8 is characterized in that the crest portion is arranged in such a way as to be opposed to the outer wall portion in the vehicle width direction of the pillar outer member in the fourth step.

As a consequence, the method of manufacturing the center pillar 8 can suppress the deformation of the outer wall portion in the vehicle width direction of the center pillar 8 against the side impact load by bringing the outer wall portion into contact with the crest portion, and favorably transmit the side impact load from the crest portion being opposed to the outer wall portion of the center pillar outer member 70 to the leg portions.

Meanwhile, the method of manufacturing the center pillar 8 is characterized in that the inner wall portion in the vehicle width direction of the pillar inner member includes the pair of trough wall portions 61*d* and 61*e* recessed inward in the vehicle width direction, and that the pair of trough portions 81*d* and 81*e* of the stiffener 80 are joined to the pair of trough wall portions 61*d* and 61*e* of the pillar inner member in the third step.

As a consequence, according to the method of manufacturing the center pillar 8, it is not necessary to locate the pair of trough portions 81*d* and 81*e* of the stiffener 80 away from the pair of trough wall portions 61*d* and 61*e* of the pillar inner member so as to avoid interference attributable to tolerances and variations, so that the leg portions can be arranged long in the direction of the pillar inner member. Thus, the leg portions can favorably resist the side impact load.

Meanwhile, the method of manufacturing the center pillar 8 is characterized in that the secondary steel plate 120 extends to the front wall portion 82 and to the rear wall portion 83 of the stiffener 80 at the portion below the heightwise intermediate portion of the stiffener 80 in the second step, that the front wall portion 82 and the rear wall portion 83 of the stiffener 80 are opposed to the front wall portion 72 and the rear wall portion 73 of the pillar outer member in the third step, respectively, and that the method further includes the fifth step of attaching the in-vehicle components 12 to the secondary steel plate 120 to be executed between the second step and the third step or between the third step and the fourth step.

As a consequence, according to the method of manufacturing the center pillar 8, it is not necessary to provide the respective in-vehicle components 12 with reinforcing patches used for attaching the in-vehicle component 11 to the center pillar 8, thus improving productivity while reducing the number of components.

Moreover, the method of manufacturing the center pillar 8 can gather the in-vehicle components 12 around the stiffener 80 in the case of attaching the in-vehicle component 11 (such as door hinge upper and lower members) across the reinforcing patches correlated to one another. Accordingly, it is possible to improve productivity without having to consider management of the tolerances among the reinforcing patches.

Although the embodiment of the present invention has been described above, it is to be understood that the present invention is not limited only to the above-described embodiment and various changes are possible within the range not departing from the scope of the present invention. Note that the stiffener of the present invention forms the substantially W-shaped cross-sectional shape by using the crest portion and the pair of trough portions located on two sides thereof. Here, the region where the crest portion is linearly continuous with one of the trough portions is referred to as the "leg portion" for the convenience sake. This leg portion is an important region that has a function as a resisting material against a side collision. In the meantime, the method of manufacturing a center pillar of the present invention may be designed to form the stiffener having the substantially W-shaped cross-section by subjecting the primary steel plate to hot press while subjecting the secondary steel plate to cold press in a separate process, and then joining the primary steel plate and the secondary steel plate thus pressed to each other by welding, adhesion, or the like.

DESCRIPTION OF REFERENCE SIGNS

1: vehicle body side structure; 2: side sill; 3: floor panel; 5: roof side rail; 7: roof arch; 8: center pillar (pillar); 10: roof arch connection bracket; 60: center pillar inner member (pillar body); 61: inner wall portion (vehicle-widthwise inner wall portion); 61*a*: joining portion; 61*b*, 61*c*: side wall; 61*d*, 61*e*: trough wall portion; 70: center pillar outer member (pillar body); 71: outer wall portion (vehicle-widthwise outer wall portion); 80: stiffener; 80*a*: upper part of upper end portion; 80*b*: lower part of upper end portion; 81: wall portion; 81*a*: crest wall portion (crest portion); 81*b*, 81*c*: joining wall portion (leg portion); 81*d*, 81*e*: trough portion; A1: deepest portion; A2, A3: gradually changed portion; BL: beltline (heightwise intermediate portion); and G: adhesive (adhesive layer)

What is claimed is:

1. A center pillar manufacturing method of a vehicle provided with a stiffener having a substantially W-shaped cross-section formed from a crest portion and a pair of trough portions provided on two sides of the crest portion, the method comprising:

a first step of stacking a primary steel plate and a secondary steel plate extending across the crest portion of the primary steel plate and having a shorter length than a length between bottom surfaces of the trough portions, and temporarily joining the primary steel plate to the secondary steel plate;

a second step of forming the stiffener by press-molding and quenching the primary steel plate substantially into a W-shape and press-molding and quenching the secondary steel plate substantially into a U-shape, wherein the crest portion is formed from a lower end portion to an upper end portion of the stiffener, the pair of trough portions are formed from a heightwise intermediate portion to the upper end portion of the stiffener, and the secondary steel plate extends to a front wall portion and to a rear wall portion of the stiffener at a portion below the heightwise intermediate portion of the stiffener;

a third step of joining a flange portion of a pillar outer member having an outer wall portion in a vehicle width direction of the center pillar to a flange portion of the stiffener, wherein the front wall portion and the rear wall portion of the stiffener are respectively opposed to a front wall portion and a rear wall portion of the pillar outer member;

a fourth step of joining a pillar inner member having an inner wall portion in the vehicle width direction of the center pillar to the pillar outer member after joining the stiffener in such a way as to sandwich the flange portion of the stiffener with a flange portion of the pillar inner member and the flange portion of the pillar outer member; and a fifth step of attaching an in-vehicle component to the secondary steel plate, to be executed between the second step and the third step or between the third step and the fourth step.

2. The center pillar manufacturing method according to claim 1, wherein
the stiffener includes a pair of leg portions that join the crest portion to the pair of trough portions, respectively, and
the secondary steel plate is temporarily joined to at least any of a projected portion for the crest portion and a pair of projected portions for the leg portions in the first step.

3. The center pillar manufacturing method according to claim 1, wherein the stiffener includes a pair of leg portions that join the crest portion to the pair of trough portions, respectively, and
the secondary steel plate is disposed inside a pair of projected bent portions which are formed between a pair of projected portions for the trough portions and the pair of projected portions for the leg portions, respectively.

4. The center pillar manufacturing method according to claim 1, wherein the pair of trough portions are formed in the second step in such a way as to be gradually flattened toward the flange portion of the stiffener at the upper end portion of the stiffener.

5. The center pillar manufacturing method according to claim 1, wherein the crest portion is arranged in such a way as to be opposed to the outer wall portion in the vehicle width direction of the pillar outer member in the fourth step.

6. The center pillar manufacturing method according to claim 1, wherein the inner wall portion in the vehicle width direction of the pillar inner member includes a pair of trough wall portions recessed inward in the vehicle width direction, and
the pair of trough portions of the stiffener are joined to the pair of trough wall portions of the pillar inner member in the third step.

7. The center pillar manufacturing method according to claim 1, wherein an inner wall part of the pillar inner is provided with multiple first hole portions arranged in an up-down direction and a second hole portion which is larger than the first hole portions is formed at a lower end portion of the inner wall part of the pillar inner.

* * * * *